US012609317B2

(12) United States Patent
Zhong et al.

(10) Patent No.: US 12,609,317 B2
(45) Date of Patent: Apr. 21, 2026

(54) LITHIUM-REPLENISHING ADDITIVE AND PREPARING METHOD THEREOF, AND LITHIUM SECONDARY BATTERY

(71) Applicant: Shenzhen Dynanonic InnovaZone New Energy Technology Co., Ltd., Shenzhen (CN)

(72) Inventors: Zeqin Zhong, Shenzhen (CN); Yuanxin Wan, Shenzhen (CN); Lingyong Kong, Shenzhen (CN); Wangbao Ren, Shenzhen (CN); Wen Zhong, Shenzhen (CN); Chengben Zhu, Shenzhen (CN); Yucai Zhang, Shenzhen (CN); Zhongke Zhao, Shenzhen (CN)

(73) Assignee: SHENZHEN DYNANONIC INNOVAZONE NEW ENERGY TECHNOLOGY CO., LTD., Shenzhen (CN)

( * ) Notice: Subject to any disclaimer, the term of this patent is extended or adjusted under 35 U.S.C. 154(b) by 664 days.

(21) Appl. No.: 17/965,903

(22) Filed: Oct. 14, 2022

(65) Prior Publication Data

US 2023/0050246 A1 Feb. 16, 2023

Related U.S. Application Data

(63) Continuation of application No. PCT/CN2022/071359, filed on Jan. 11, 2022.

(30) Foreign Application Priority Data

Feb. 10, 2021 (CN) .......................... 202110183370.3

(51) Int. Cl.
*H01M 4/00* (2006.01)
*H01M 4/36* (2006.01)
(Continued)

(52) U.S. Cl.
CPC ............. *H01M 4/62* (2013.01); *H01M 4/366* (2013.01); *H01M 4/505* (2013.01); *H01M 4/525* (2013.01);
(Continued)

(58) Field of Classification Search
CPC ........ H01M 4/62; H01M 4/366; H01M 4/505; H01M 4/525; H01M 4/587; H01M 2004/021; H01M 2004/028
See application file for complete search history.

(56) References Cited

U.S. PATENT DOCUMENTS

2014/0315078 A1* 10/2014 Chang ................... H01M 4/525
429/188
2020/0335819 A1 10/2020 Collins et al.

FOREIGN PATENT DOCUMENTS

CN 1745490 A 3/2006
CN 102257628 A 11/2011
(Continued)

OTHER PUBLICATIONS

Kim et al. "Air stable Al2O3-coated Li2NiO2 cathode additive as a surplus current consumer in a Li-ion cell" J. Mater. Chem., 2008,18, 5880-5887 (Year: 2008).*
(Continued)

*Primary Examiner* — Nicholas P D'Aniello
(74) *Attorney, Agent, or Firm* — Scully, Scott, Murphy & Presser, P.C.

(57) ABSTRACT

A lithium-replenishing additive is provided. The lithium-replenishing additive includes a lithium-rich-material core and a shell layer disposed at the lithium-rich-material core. The lithium-rich-material core is made of a lithium-rich material with an average chemical formula of $aNi_xM_yO_2 \cdot bLi_2O$, where $0.95 \le x \le 1$, $0.01 \le y \le 0.05$, $1 \le z \le 1.15$, $0.8 \le a \le 1.1$, $0.8 \le b \le 1.1$, and the M includes one or more of
(Continued)

copper (Cu), cobalt (Co), aluminum (Al), titanium (Ti), vanadium (V), zirconium (Zr), or iron (Fe). The shell layer includes a polymer layer. A preparing method of a lithium-replenishing additive and a lithium secondary battery are further provided.

18 Claims, 7 Drawing Sheets

(51) Int. Cl.

| | | |
|---|---|---|
| *H01M 4/505* | (2010.01) | |
| *H01M 4/525* | (2010.01) | |
| *H01M 4/587* | (2010.01) | |
| *H01M 4/62* | (2006.01) | |
| *H01M 4/02* | (2006.01) | |

(52) U.S. Cl.

CPC ...... *H01M 4/587* (2013.01); *H01M 2004/021* (2013.01); *H01M 2004/028* (2013.01)

(56) References Cited

FOREIGN PATENT DOCUMENTS

| CN | 105702961 | A | 6/2016 |
|---|---|---|---|
| CN | 108091843 | A | 5/2018 |
| CN | 109786746 | A | 5/2019 |
| CN | 110165143 | A | 8/2019 |
| CN | 110911736 | A | 3/2020 |
| CN | 111384428 | A | 7/2020 |
| CN | 111682181 | A | 9/2020 |
| CN | 112054181 | A | 12/2020 |
| CN | 112164796 | A | 1/2021 |
| CN | 112218829 | A | 1/2021 |
| CN | 112310372 | A | 2/2021 |
| KR | 20060008568 | A | 1/2006 |
| KR | 20160059361 | A | 5/2016 |
| KR | 20180062112 | A | 6/2018 |

OTHER PUBLICATIONS

First Office Action dated Sep. 5, 2024 for Chinese Patent Application No. 202110183370.3.

Notice of Granting Invention Patent Rights dated Mar. 3, 2025 for Chinese Patent Application No. 202110183370.3.

International Search Reoprt dated Mar. 30, 2022 issued in PCT/CN2022/071359.

* cited by examiner

30

<u>40</u>

LITHIUM-REPLENISHING ADDITIVE AND PREPARING METHOD THEREOF, AND LITHIUM SECONDARY BATTERY

CROSS-REFERENCE TO RELATED APPLICATIONS

This application is a continuation of International Application No. PCT/CN2022/071359, filed Jan. 11, 2022, which claims priority to Chinese Patent Application No. 202110183370.3 filed Feb. 10, 2021, the entire disclosures of which are incorporated herein by reference.

TECHNICAL FIELD

This disclosure relates to the field of lithium-ion batteries, and in particular to a lithium-replenishing additive and a preparing method thereof, and a lithium secondary battery.

BACKGROUND

During a first charging of a battery, surface solid electrolyte interphase (SEI) films are formed on a surface of a cathode and a surface of an anode. Due to formation of the SEI films, lithium in the battery is consumed and converted into an inactive lithium compound, thereby resulting in a loss of reversible lithium, reduction of a first efficiency, and reduction of a discharging capacity of the battery.

In order to compensate for a loss of lithium caused by the formation of the SEI films during the first charging, an existing method is to add a lithium-replenishing additive to the cathode or the anode. However, due to high activity, an existing lithium-replenishing additive is easy to react with water and carbon dioxide ($CO_2$) in air, such that a residual alkali content in a surface of the lithium-replenishing additive is high, which reduces a lithium-replenishing effect and results in a loss of a battery capacity. In order to ensure effective lithium replenishment, the existing lithium-replenishing additive has extremely strict requirements for an environment during use and storage. In addition, during preparing, the lithium-replenishing additive is easy to be oxidized and difficult to be synthesized in quantity, which is not beneficial to industrial production. Therefore, a lithium-replenishing additive and a preparing method thereof are necessary to be provided to solve problems of poor stability, a poor lithium-replenishing effect, and difficulty in industrial production of the existing lithium-replenishing additive.

SUMMARY

A lithium-replenishing additive is provided in a first aspect of the present disclosure. The lithium-replenishing additive includes a lithium-rich-material core and a shell layer disposed at the lithium-rich-material core. The lithium-rich-material core is made of a lithium-rich material with an average chemical formula of $aNi_xM_yO_z \cdot bLi_2O$, where $0.95 \le x \le 1$, $0.01 \le y \le 0.05$, $1 \le z \le 1.15$, $0.8 \le a \le 1.1$, $0.8 \le b \le 1.1$, and the M includes one or more of copper (Cu), cobalt (Co), aluminum (Al), titanium (Ti), vanadium (V), zirconium (Zr), or iron (Fe). The shell layer includes a polymer layer.

A preparing method of a lithium-replenishing additive is provided in a second aspect of the present disclosure. The method includes the following. A nickel source and a lithium source are fully mixed to react at 500° C.-850° C. for 10 h-48 h to obtain a lithium-rich-material-core precursor. The lithium-rich-material-core precursor and a doping source are mixed to react at 400° C.-700° C. for 1 h-6 h to obtain a lithium-rich-material core. The doping source includes a doping element M, and the doping element M includes one or more of Cu, Co, Al, Ti, V, Zr, or Fe. The lithium-rich-material core includes a lithium-rich material with an average chemical formula of $aNi_xM_yO_z \cdot bLi_2O$, where $0.95 \le x \le 1$, $0.01 \le y \le 0.05$, $1 \le z \le 1.15$, $0.8 \le a \le 1.1$, $0.8 \le b \le 1.1$, and the M includes one or more of Cu, Co, Al, Ti, V, Zr, or Fe. The lithium-rich-material core is coated with a polymer to form a polymer layer, to obtain the lithium-replenishing additive.

A lithium secondary battery is provided in a third aspect of the present disclosure. The lithium secondary battery includes a cathode sheet, an anode sheet, a separator, and an electrolytic solution. The cathode sheet includes the lithium-replenishing additive provided in the first aspect of the present disclosure.

DETAILED DESCRIPTION

Figure 1:
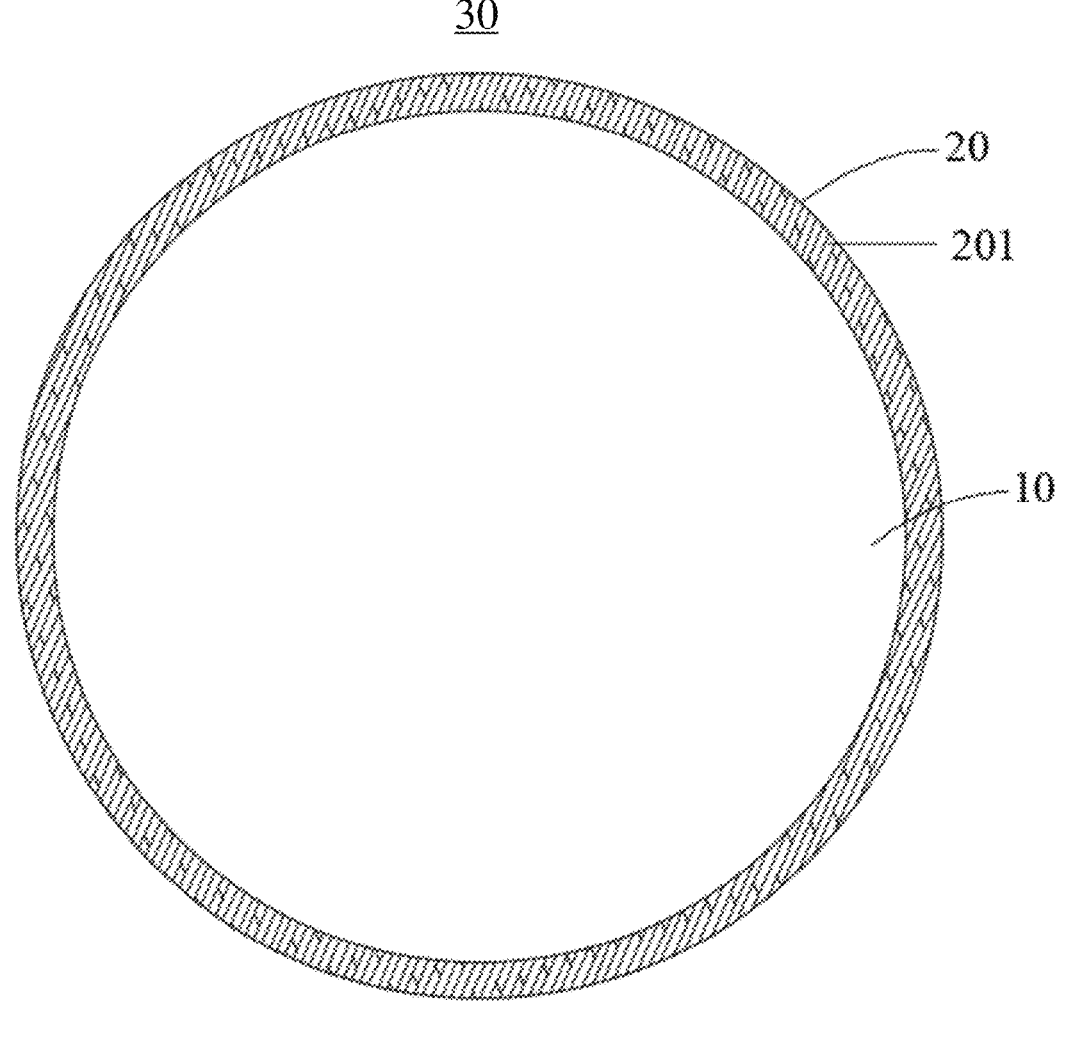
FIG. 1 is a schematic structural diagram of a lithium-replenishing additive provided in an implementation of the present disclosure.

Technical solutions of implementations will be described clearly and completely with reference to accompanying drawings in the implementations. Apparently, the implementations described hereinafter are merely some implementations, rather than all implementations of the present disclosure. All other implementations obtained by those of ordinary skill in the art based on the implementations without creative efforts shall fall within the protection scope of the disclosure.

In view of this, a lithium-replenishing additive is provided in the present disclosure. The lithium-replenishing additive not only can effectively replenish a lithium secondary battery with lithium to improve a first efficiency of a battery, but also can have good stability to be not easy to react in air, which is beneficial to production, storage, and transportation of the lithium-replenishing additive. A preparing method of a lithium-replenishing additive is further provided in the present disclosure.

A lithium-replenishing additive is provided in a first aspect of the present disclosure. The lithium-replenishing additive includes a lithium-rich-material core and a shell layer disposed at the lithium-rich-material core. The lithium-rich-material core is made of a lithium-rich material with an average chemical formula of $aNi_xM_yO_z \cdot bLi_2O$, where $0.95 \leq x \leq 1$, $0.01 \leq y \leq 0.05$, $1 \leq z \leq 1.15$, $0.8 \leq a \leq 1.1$, $0.8 \leq b \leq 1.1$, and the M includes one or more of copper (Cu), cobalt (Co), aluminum (Al), titanium (Ti), vanadium (V), zirconium (Zr), or iron (Fe). The shell layer includes a polymer layer.

In the lithium-replenishing additive in the present disclosure, the lithium-rich-material core is made of $aNi_xM_yO_z \cdot bLi_2O$, which effectively compensates for a capacity loss during a first charging-and-discharging of the lithium secondary battery and improves a first charging-and-discharging efficiency. A doping element M can relieve a reaction of lithium and nickel with air, such that the lithium-replenishing additive is inhibited from forming a residual alkali, which makes the lithium-replenishing additive have good stability. The polymer layer can effectively isolate air, such that the stability of the lithium-replenishing additive is further improved, and the lithium-replenishing additive can stably exist in air, which is beneficial to production, storage, and transportation of the lithium-replenishing additive.

Optionally, the lithium-rich-material core includes an internal layer and a doped interfacial layer, the doped interfacial layer is disposed on at least part of a surface of the internal layer, and the M is in the doped interfacial layer.

Optionally, the doped interfacial layer has a thickness of 1 nm-100 nm.

Optionally, the lithium-rich-material core has a median particle size D50 of 2 μm-10 μm, D10/D50≥0.3, and D90/D50≤2.

Optionally, a mass of the lithium-rich-material core accounts for 90%-99% of a mass of the lithium-replenishing additive.

Optionally, the polymer layer includes a polymer, and the polymer includes one or more of an organic polymer with a structure of $[C_6H_7O_6Na]_n$, an organic polymer with a structure of $[C_6H_7O_2(OH)_2OCH_2COONa]_n$, an organic polymer with a structure of $[C_3H_4O_2]_n$, an organic polymer with a structure of $[C_3H_3O_2M_a]_n$, an organic polymer with a structure of $[C_3H_3N]_n$, an organic polymer containing a structure of $—[CH_2—CF_2]_n$, an organic polymer containing a structure of $—[NHCO]—$, an organic polymer containing a structure of an imide ring $—[CO—N—CO—]—$ in a main chain, or polyvinylpyrrolidone (PVP), where $M_a$ is an alkali metal element.

Optionally, the polymer has a molecular weight greater than or equal to 100,000.

Optionally, the polymer includes one or more of polyvinylidene fluoride (PVDF), sodium alginate (SA), sodium carboxymethyl cellulose (SCMC), polyacrylic acid (PAA), polyacrylate salt, polyacrylonitrile (PAN), polyamide (PA), polyimide (PI), or PVP. Furthermore, the polymer includes one or two of SCMC and PAA.

Optionally, the polymer layer further includes a conductive agent. The conductive agent includes one or more of carbon black, graphite, conductive carbon microspheres, carbon nanofibers, carbon nanotubes, carbon 60 (C60), or graphene.

Optionally, in the polymer layer, a mass ratio of the polymer to the conductive agent is 1:(0.3-1.5).

Optionally, a mass of the polymer layer accounts for 1%-10% of a total mass of the lithium-replenishing additive.

Optionally, the polymer layer has a thickness of 2 nm-50 nm. Furthermore, the polymer layer has a thickness of 5 nm-40 nm.

Optionally, the shell layer further includes an electrochemically active layer disposed on a surface of the polymer layer, and the electrochemically active layer is made of an electrochemically active material.

Optionally, the electrochemically active material has a particle size of 30 nm-200 nm.

Optionally, the electrochemically active material includes one or more of lithium iron phosphate, lithium iron manganese phosphate, lithium vanadium phosphate (LVP), lithium vanadyl phosphate, lithium vanadium fluorophosphate, lithium titanate, or lithium nickel cobalt manganate.

Optionally, the electrochemically active material further includes carbon, and a mass of carbon accounts for 0.5%-3% of a mass of the electrochemically active material.

Optionally, the electrochemically active layer has a thickness of 100 nm-500 nm.

Optionally, a mass of the electrochemically active layer accounts for 1%-9% of the total mass of the lithium-replenishing additive, a mass of a core accounts for 90%-98% of the total mass of the lithium-replenishing additive, and a mass of the polymer layer accounts for 1%-9% of the total mass of the lithium-replenishing additive.

Optionally, the lithium-replenishing additive has a specific surface area of 1 m²/g-10 m²/g. Furthermore, the lithium-replenishing additive has the specific surface area of 1 m²/g-5 m²/g.

Optionally, the lithium-replenishing additive has a median particle size D50 of 2 μm-10 μm, D10/D50≥0.3, and D90/D50≤2.

The lithium-replenishing additive, provided in a first aspect of the present disclosure, can effectively replenish losses of lithium ions during the first charging-and-discharging of the lithium secondary battery, thereby improving a first charging-and-discharging efficiency of a lithium-ion battery, and increasing an energy density of the battery. In addition, the lithium-replenishing additive also has good stability, can stably exist in air, and has a low residual alkali on the surface, which is beneficial to adding the lithium-replenishing additive to the lithium secondary battery to realize lithium replenishment.

A preparing method of a lithium-replenishing additive is provided in a second aspect of the present disclosure. The method includes the following. A nickel source and a lithium source are fully mixed to react at 500° C.-850° C. for 10 h-48 h to obtain a lithium-rich-material-core precursor. The lithium-rich-material-core precursor and a doping source are mixed to react at 400° C.-700° C. for 1 h-6 h to obtain a lithium-rich-material core. The doping source includes a doping element M, and the doping element M includes one or more of Cu, Co, Al, Ti, V, Zr, or Fe. The lithium-rich-material core includes a lithium-rich material with an average chemical formula of $aNi_xM_yO_z \cdot bLi_2O$, where $0.95 \leq x \leq 1$, $0.01 \leq y \leq 0.05$, $1 \leq z \leq 1.15$, $0.8 \leq a \leq 1.1$, $0.8 \leq b \leq 1.1$, and the M includes one or more of Cu, Co, Al, Ti, V, Zr, or Fe. The lithium-rich-material core is coated with a polymer to form a polymer layer, to obtain the lithium-replenishing additive.

Optionally, the polymer includes one or more of an organic polymer with a structure of $[C_6H_7O_6Na]_n$, an organic polymer with a structure of $[C_6H_7O_2(OH)_2OCH_2COONa]_n$, an organic polymer with a structure of $[C_3H_4O_2]_n$, an organic polymer with a structure of $[C_3H_3O_2M_a]_n$, an organic polymer with a structure of $[C_3H_3N]_n$, an organic polymer containing a structure of $—[CH_2—CF_2]_n$, an organic polymer containing a structure of $—[NHCO]—$, an organic polymer containing a structure of an imide ring $—[CO—N—CO—]—$ in a main chain, or PVP, where $M_a$ is an alkali metal element.

Optionally, after the lithium-rich-material core is coated with the polymer to form the polymer layer, an electrochemically active layer is prepared on the polymer layer. The electrochemically active layer is made of an electrochemically active material.

Optionally, the electrochemically active material includes one or more of lithium iron phosphate, lithium iron manganese phosphate, LVP, lithium vanadyl phosphate, lithium vanadium fluorophosphate, lithium titanate, or lithium nickel cobalt manganate.

Optionally, the lithium source includes one or more of lithium hydroxide, lithium carbonate, lithium nitrate, lithium acetate, or lithium oxide.

Optionally, the nickel source includes one or more of nickel hydroxide, nickel nitrate, nickel chloride, nickel acetate, or nickel oxide.

Optionally, an equipment for the heat treatment includes any one of a roller hearth kiln, a pusher kiln, a rotary furnace, a rotary kiln, or a fluidized bed.

Optionally, a coating method of the polymer includes the following. The lithium-rich-material core and a polymer solution are mixed and dried to obtain the polymer layer.

Optionally, a preparing method of the electrochemically active layer includes the following. The lithium-rich-material core with the polymer layer and the electrochemically active material are mixed, such that the electrochemically active material is stacked on the surface of the polymer layer to obtain the lithium-replenishing additive.

The preparing method of a lithium-replenishing additive, provided in a second aspect of the present disclosure, is simple in process and is beneficial to industrial production. A prepared lithium-replenishing additive has a low impurity content and good stability, such that cycle stability of the battery can be improved by applying the prepared lithium-replenishing additive in the lithium secondary battery.

A lithium secondary battery is provided in a third aspect of the present disclosure. The lithium secondary battery includes a cathode sheet, an anode sheet, a separator, and an electrolytic solution. The cathode sheet includes the lithium-replenishing additive provided in the first aspect of the present disclosure.

The lithium secondary battery, provided in a third aspect of the present disclosure, has relatively high energy density, cycle performance, and safety.

A lithium-replenishing additive is provided in implementations of the present disclosure and is for replenishing a cathode of a lithium secondary battery with lithium. Reference can be made to FIG. 1, which is a schematic structural diagram of a lithium-replenishing additive 30 provided in an implementation of the present disclosure. The lithium-replenishing additive 30 includes a lithium-rich-material core 10 and a shell layer 20 disposed at the lithium-rich-material core 10. The lithium-rich-material core 10 is made of a lithium-rich material with an average chemical formula of $aNi_xM_yO_z \cdot bLi_2O$, where $0.95 \leq x \leq 1$, $0.01 \leq y \leq 0.05$, $1 \leq z \leq 1.15$, $0.8 \leq a \leq 1.1$, $0.8 \leq b \leq 1.1$, and the M includes one or more of copper (Cu), cobalt (Co), aluminium (Al), titanium (Ti), vanadium (V), zirconium (Zr), or Iron (Fe). The shell layer 20 includes a polymer layer 201 coated on a surface layer of the lithium-rich-material core 10.

In the present disclosure, the lithium-rich-material core is made of the lithium-rich material with the average chemical formula of $aNi_xM_yO_z \cdot bLi_2O$, where $0.95 \leq x \leq 1$, $0.01 \leq y \leq 0.05$, $1 \leq z \leq 1.15$, $0.8 \leq a \leq 1.1$, $0.8 \leq b \leq 1.1$, a and b are mole numbers, and the M includes one or more of Cu, Co, Al, Ti, V, Zr, or Fe. Lithium in the lithium-rich-material core can effectively compensate for a lithium loss during first charging of the lithium secondary battery, and nickel can strengthen a structural skeleton of the lithium-rich-material core and improve structural stability of a core. However, nickel has a certain activity, and a side reaction of nickel with an electrolytic solution is easy to occur, such that performance of a battery is reduced. In addition, addition of nickel will lead to a reaction of the lithium-replenishing additive with water or carbon dioxide ($CO_2$) to generate residual alkalis such as lithium carbonate or lithium hydroxide. Firstly, these residual alkalis will easily cause an electrode slurry to be jelly during preparing, which is not beneficial to coating of the electrode slurry. Secondly, these residual alkalis will cause a side reaction of the cathode sheet with the electrolytic solution, resulting in decomposition and gas production of the electrolytic solution. In addition, these residual alkalis can react with a battery current-collector at a high temperature to release hydrogen, resulting in the gas production and expansion of a battery and damage to the battery current-collector, thereby reducing safety of the battery. In order to improve stability of the lithium-replenishing additive and inhibit generation of the residual alkalis, in the present disclosure, the lithium-rich-material core is doped with a metal element M, and the metal element M includes one or more of Cu, Co, Al, Ti, V, Zr, or Fe. The lithium-rich-material core is doped, such that a crystal structure strength of the lithium-rich material can be improved, and reactivity of lithium and nickel with water or $CO_2$ can be reduced, thereby reducing a residual alkali content and improving safety performance and cycle performance of the battery. In some implementations of the present disclosure, the element M is one or two of Cu and Al. Cu or Al can well reduce activity of nickel and inhibit precipitation of the residual alkalis, which is beneficial to improving structural stability of lithium-replenishing additive.

Figure 2:
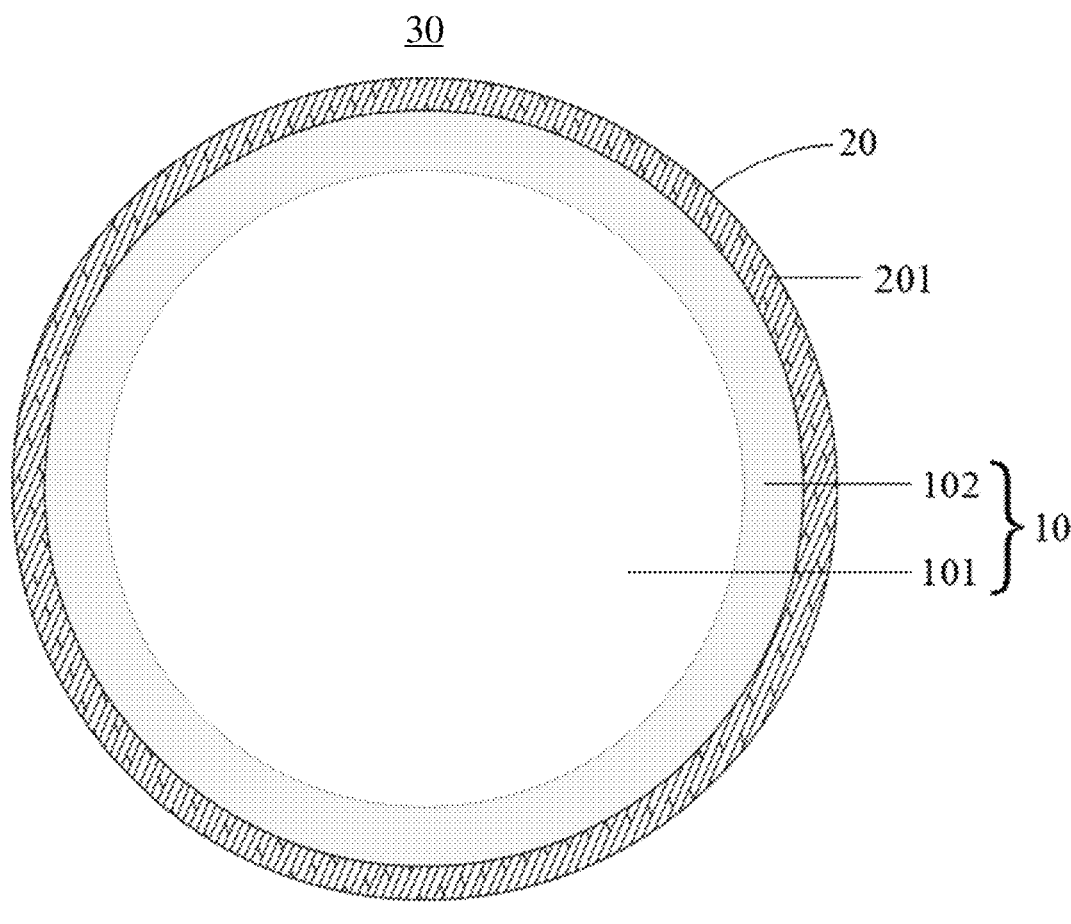
FIG. 2 is a schematic structural diagram of a lithium-replenishing additive provided in an implementation of the present disclosure.

In some implementations of the present disclosure, the element M is only doped in the surface layer of the lithium-rich-material core. In other words, the element M is doped in part of the lithium-rich-material core, the part of the lithium-rich-material core doped with the element M is a doped interfacial layer, part of the lithium-rich-material core not doped with the element M is an internal layer, and this doping method is interfacial layer doping. Reference can be made to FIG. 2, which is a schematic structural diagram of a lithium-replenishing additive 30 provided in an implementation of the present disclosure. The lithium-replenishing additive 30 includes the lithium-rich-material core 10 and the shell layer 20 disposed at the surface of the lithium-rich-material core 10, and the lithium-rich-material core 10 includes an internal layer 101 and a doped interfacial layer 102. In the implementations of the present disclosure, by the interfacial layer doping, a content of the element M can be gradually decreased in a direction from the surface layer of the lithium-rich-material core to a center of the lithium-rich-material core, and contents of lithium and nickel can be gradually increased in the direction from the surface layer of the lithium-rich-material core to the center of the lithium-rich-material core. The lithium-rich-material core with the above element distribution can reduce an influence of a doping element M on a capacity of the lithium-replenishing additive, ensure higher purity of the internal layer of the lithium-rich-material core, make the lithium-replenishing additive have a relatively high effective capacity, reduce reactivity of the lithium-rich-material core, and improve stability of the lithium-replenishing additive. In the implementations of the present disclosure, the doped interfacial layer has a thickness of 1 nm-100 nm. A specific thickness of the doped interfacial layer may be, but is not limited to, 1 nm, 5 nm, 10 nm, 20 nm, 30 nm, 50 nm, 70 nm, 80 nm, 90 nm, or 100 nm.

In the implementations of the present disclosure, the lithium-rich-material core has a median particle size D50 of 2 $\mu$m-10 $\mu$m, and a specific median particle size D50 of the lithium-rich-material core may be, but is not limited to, 2 $\mu$m, 4 $\mu$m, 5 $\mu$m, 7 $\mu$m, 9 $\mu$m, or 10 $\mu$m. The median particle size of the lithium-rich-material core is controlled within the above range, which is beneficial for the lithium-replenishing additive to realize rapid and effective lithium replenishment to the lithium secondary battery. In the implementations of the present disclosure, the lithium-rich-material core has a particle size of D10/D50$\geq$0.3, and D90/D50$\leq$2. A particle size of the lithium-rich-material core is controlled in a narrow distribution state, such that stable electrochemical performance of the lithium-replenishing additive can be realized. In the implementations of the present disclosure, a mass of the lithium-rich-material core accounts for 90%-99% of a mass of the lithium-replenishing additive. In some implementations of the present disclosure, the mass of the lithium-rich-material core accounts for 95%-99% of the mass of the lithium-replenishing additive. When the lithium-rich-material core has a higher content, the lithium-replenishing additive has a better effect of lithium replenishment. A specific mass of lithium-rich-material core may account for, but is not limited to, 90%, 92%, 93%, 95%, 98%, or 99% of the mass of the lithium-replenishing additive.

In the present disclosure, the shell layer is disposed on the surface layer of the lithium-rich-material core, such that direct contact between the lithium-rich-material core and air can be avoided, a capacity loss caused by a reaction of the lithium-rich-material core with water or $CO_2$ can be reduced, and a residual alkali amount of the lithium-replenishing additive can be reduced, which is beneficial to preparation of a cathode slurry and realizes effective lithium replenishment to the lithium secondary battery. In the implementations of the present disclosure, the shell layer includes a polymer layer, and the polymer layer includes a polymer. In the implementations of the present disclosure, the polymer includes one or more of an organic polymer with a structure of $[C_6H_7O_6Na]_n$, an organic polymer with a structure of $[C_6H_7O_2(OH)_2OCH_2COONa]_n$, an organic polymer with a structure of $[C_3H_4O_2]_n$, an organic polymer with a structure of $[C_3H_3O_2M_a]_n$, an organic polymer with a structure of $[C_3H_3N]_n$, an organic polymer containing a structure of $—[CH_2—CF_2]_n$, an organic polymer containing a structure of $—[NHCO]—$, an organic polymer containing a structure of an imide ring $—[CO—N—CO—]—$ in a main chain, or polyvinylpyrrolidone (PVP), where $M_a$ is an alkali metal element.

In some implementations of the present disclosure, the polymer includes one or more of polyvinylidene fluoride (PVDF), sodium alginate (SA), sodium carboxymethyl cellulose (SCMC), polyacrylic acid (PAA), polyacrylate salt, polyacrylonitrile (PAN), polyamide (PA), polyimide (PI), or PVP. In some implementations of the present disclosure, the polymer includes one or two of SCMC and PAA. SCMC and PAA are macromolecular polymers of a two-dimensional planarizing type, which have a good adhesive effect and can effectively coat the lithium-rich-material core, thereby avoiding the contact between the lithium-rich-material core and air and improving the stability of the lithium-replenishing additive. In the implementations of the present disclosure, the polymer has a molecular weight greater than or equal to 100,000. A specific molecular weight of the polymer may be, but is not limited to, 100,000, 150,000, 200, 000, 300,000, 500,000, or 1,000,000. When the polymer has a larger molecular weight, the polymer layer has higher density and structural strength, which is more beneficial to protection of the lithium-rich-material core.

In some implementations of the present disclosure, the polymer layer further includes a conductive agent, the conductive agent includes one or more of carbon black, graphite, conductive carbon microspheres, carbon nanofibers, carbon nanotubes, carbon 60 (C60), or graphene. The conductive agent is added to the polymer layer, such that an electrical conductivity property of the polymer layer can be enhanced and an electrical conductivity rate of the lithium-replenishing additive can be improved, which is beneficial to transmission of electrons and ions. In the implementations of the present disclosure, a mass ratio of the polymer to the conductive agent is 1:(0.3-1.5). Furthermore, the mass ratio of the polymer to the conductive agent is 1:(0.5-1.2). A specific mass ratio of the polymer to the conductive agent may be, but is not limited to, 1:0.3, 1:0.5, 1:0.7, 1:1, 1:1.2, or 1:1.5. When the mass ratio of polymer to the conductive agent is within the above range, the polymer layer can completely coat the lithium-rich-material core and improve the stability of lithium-replenishing additive. In addition, the polymer layer has a good electrical conductivity property and can reduce electrochemical impedance, thus effectively improving the capacity of the battery.

In the implementations of the present disclosure, the polymer layer has a thickness of 2 nm-50 nm. Furthermore, the polymer layer has a thickness of 5 nm-40 nm. A specific thickness of the polymer layer may be, but is not limited to, 2 nm, 3 nm, 5 nm, 8 nm, 10 nm, 15 nm, 20 nm, 40 nm, or 50 nm. When the polymer layer is within the above thickness range, the polymer layer can effectively protect the lithium-rich-material core without affecting dynamic transmission of ions and electrons, thereby realizing effective lithium replenishment to the battery. In the implementations of the present disclosure, a mass of the polymer layer accounts for 1%-10% of a total mass of the lithium-replenishing additive. A specific mass of the polymer layer may account for, but is not limited to, 1%, 2%, 3%, 5%, 7%, 9%, or 10% of the total mass of the lithium-replenishing additive.

Figure 3:
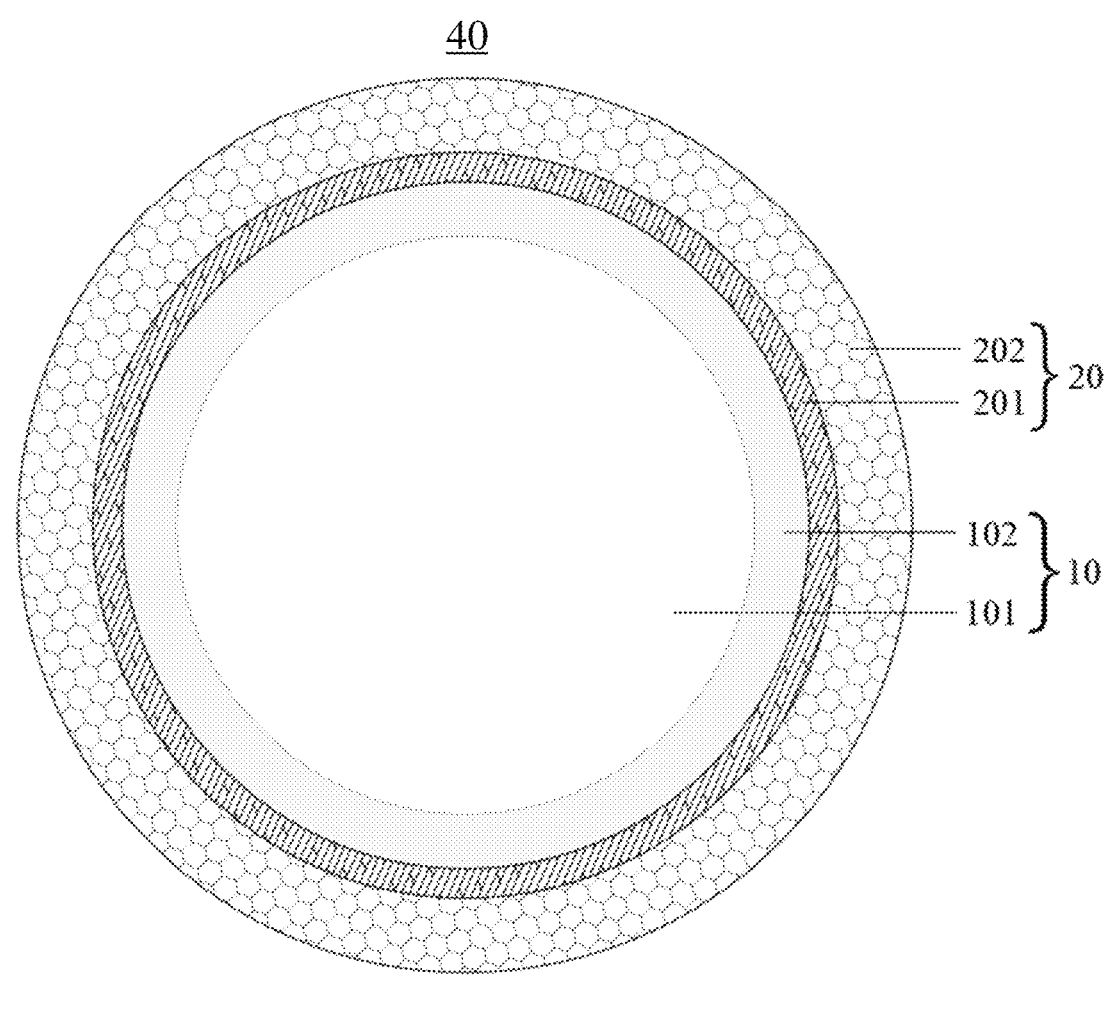
FIG. 3 is a schematic structural diagram of a lithium-replenishing additive provided in an implementation of the present disclosure.

In some implementations of the present disclosure, the shell layer further includes an electrochemically active layer disposed on a surface of the polymer layer, and the electrochemically active layer is made of an electrochemically active material. Reference can be made to FIG. 3, which is a schematic structural diagram of a lithium-replenishing additive 40 provided in an implementation of the present disclosure. The lithium-replenishing additive 40 includes the lithium-rich-material core 10 and the shell layer 20, the lithium-rich-material core 10 includes the internal layer 101 and the doped interfacial layer 102, and the shell layer 20 includes a polymer layer 201 and an electrochemically active layer 202. In the present disclosure, the electrochemically active layer is disposed on the surface of the polymer layer, such that the electrical conductivity property of the lithium-replenishing additive can be improved, transport of electrons and ions in the lithium-replenishing additive can be facilitated, and the electrochemical impedance can be reduced. In addition, with aid of the electrochemically active layer, the lithium-rich-material core can also be protected to avoid the contact between the lithium-rich-material core and air and ensure that the lithium-replenishing additive has a higher effective capacity.

In the present disclosure, the electrochemically active material is attached to the surface of the polymer layer through an adhesive effect of the polymer layer and is stacked, such that the electrochemically active layer is formed. In the implementations of the present disclosure, the electrochemically active material includes one or more of lithium iron phosphate, lithium iron manganese phosphate, lithium vanadium phosphate (LVP), lithium vanadyl phosphate, lithium vanadium fluorophosphate, lithium titanate, or lithium nickel cobalt manganate. In the implementations of the present disclosure, the electrochemically active material further includes carbon, and a mass of carbon accounts for 0.5%-3% of a mass of the electrochemically active material. Carbon is added to the electrochemically active material, such that the electrical conductivity property of the electrochemically active layer can be improved and the electrochemical impedance can be reduced. In the implementations of the present disclosure, the electrochemically active material has a particle size of 30 nm-200 nm. A specific particle size of the electrochemically active material may be, but is not limited to, 30 nm, 40 nm, 50 nm, 70 nm, 100 nm, 120 nm, 150 nm, 170 nm, or 200 nm. The particle size of electrochemically active material will affect a thickness of the electrochemically active layer. Not only can the electrochemically active material with the above particle size form an electrochemically active layer with a compact structure, but also the electrochemically active layer has a moderate thickness, which can realize a good coating effect. In the implementations of the present disclosure, the electrochemically active layer has the thickness of 100 nm-500 nm. A specific thickness of the electrochemically active layer may be, but is not limited to, 100 nm, 200 nm, 300 nm, 400 nm, or 500 nm. In the implementations of the present disclosure, a mass of the electrochemically active layer accounts for 1%-9% of a total mass of the lithium-replenishing additive. A specific mass of the electrochemically active layer may account for, but is not limited to, 1%, 2%, 5%, 7%, or 9% of the total mass of the lithium-replenishing additive.

In the implementations of the present disclosure, the lithium-replenishing additive has a Brunauer-Emmett-Teller (BET) specific surface area of 1 m²/g-10 m²/g. Furthermore, the lithium-replenishing additive has the BET specific surface area of 1 m²/g-5 m²/g. A specific surface area of the lithium-replenishing additive is controlled within the above range, such that rapid transmission of ions and electrons in the lithium-replenishing additive can be ensured. In addition, a contact area between the lithium-replenishing additive and air is relatively small, and a risk of reaction is lower, which can ensure that the lithium-replenishing additive has a higher effective capacity. In the implementations of the present disclosure, the lithium-replenishing additive has a median particle size D50 of 2 μm-10 μm, and a specific median particle size D50 of the lithium-replenishing additive may be, but is not limited to, 2 μm, 4 μm, 5 μm, 7 μm, 9 μm, or 10 μm. In the implementations of the present disclosure, the lithium-replenishing additive has a particle size of D10/D50≥0.3, and D90/D50≤2.

Figure 4:
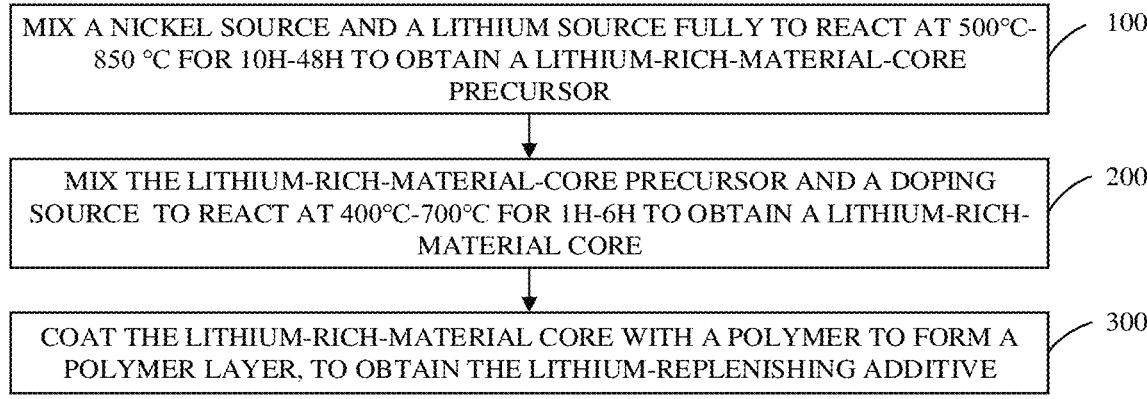
FIG. 4 is a schematic flowchart of a preparing method of a lithium-replenishing additive provided in an implementation of the present disclosure.

A preparing method of a lithium-replenishing additive is further provided in the present disclosure. Reference can be made to FIG. 4, which is a schematic flowchart of a preparing method of a lithium-replenishing additive provided in an implementation of the present disclosure. The method includes the following.

At block 100, a nickel source and a lithium source are fully mixed to react at 500° C.-850° C. for 10 h-48 h to obtain a lithium-rich-material-core precursor.

At block 200, the lithium-rich-material-core precursor and a doping source are mixed to react at 400° C.-700° C. for 1 h-6 h to obtain a lithium-rich-material core.

At block 300, the lithium-rich-material core is coated with a polymer to form a polymer layer, to obtain the lithium-replenishing additive.

In the implementations of the present disclosure, at block 100 and block 200, a heat treatment is performed on the nickel source and the lithium source, a heat treatment is performed on the lithium-rich-material-core precursor and the doping source, and each heat treatment is performed in a non-oxidizing atmosphere. In the implementations of the present disclosure, the non-oxidizing atmosphere includes one or more of a nitrogen gas, a helium gas, an argon gas, or a hydrogen gas. In the implementations of the present disclosure, a heat-treatment temperature for preparing a lithium-rich-core precursor after the nickel source and the lithium source are mixed is 500° C.-850° C., and heat-treatment time is 10 h-48 h. In some implementations of the present disclosure, the heat-treatment temperature for preparing the lithium-rich-core precursor is 600° C.-700° C., and the heat-treatment time is 15 h-24 h. Specific heat-treatment time for preparing the lithium-rich-core precursor may be, but is not limited to, 500° C., 550° C., 600° C., 650° C., 700° C., or 850° C., and specific heat-treatment time may be, but is not limited to, 10 h, 15 h, 20 h, 25 h, 30 h, 35 h, 40 h, or 48 h. In the implementations of the present disclosure, after the heat treatment is completed, a product is mechanically crushed and graded to obtain the lithium-rich-material-core precursor.

In the implementations of the present disclosure, after the lithium-rich-material-core precursor is obtained, the interfacial layer doping is performed by mixing the lithium-rich-material-core precursor with the doping source. In the implementations of the present disclosure, a temperature of the interfacial layer doping is 400° C.-700° C., time of the interfacial layer doping is 1 h-6 h. A specific temperature of the interfacial layer doping may be, but is not limited to, 400° C., 450° C., 500° C., 550° C., 600° C., 650° C., or 700° C., and specific time of the interfacial layer doping may be, but is not limited to, 1 h, 2 h, 4 h, 5 h, or 6 h. In the present disclosure, by a stepped sintering method, the element M can be permeated from the surface layer of the lithium-rich-material core to an interior of the lithium-rich-material core. Finally, a structure, where a content of the element M is gradually decreased in the direction from the surface layer of the lithium-rich-material core to the center of the lithium-rich-material core, and contents of lithium and nickel are gradually increased in the direction from the surface layer of the lithium-rich-material core to the center of the lithium-rich-material core, can be formed, such that the stability of the lithium-rich-material core is improved. In the implementations of the present disclosure, an equipment for the heat treatment may be any one of a rotary furnace, a rotary kiln, a box type furnace, a tubular furnace, a roller hearth kiln, a pusher kiln, or a fluidized bed.

In the implementations of the present disclosure, the lithium source includes one or more of lithium hydroxide, lithium carbonate, lithium nitrate, lithium acetate, or lithium oxide (Li₂O). The nickel source includes one or more of nickel hydroxide, nickel nitrate, nickel chloride, nickel acetate, or nickel oxide (NiO). In the implementations of the present disclosure, the doping source includes a metal element M, and the doping source may be one or more of an oxide, a hydroxide, or a salt of the metal element M. In the implementations of the present disclosure, the metal element M includes one or more of Cu, Co, Al, Ti, V, Zr, or Fe.

In the implementations of the present disclosure, at block 300, the lithium-rich-material core is coated with the polymer to form the polymer layer as follows. The lithium-richmaterial core and a polymer solution are mixed and dried to obtain the polymer layer. By solution mixing, the polymer layer can be completely coated on the surface of the lithium-rich-material core, such that the stability of the lithium-replenishing additive is improved. In the implementations of the present disclosure, the lithium-rich-material core and the polymer solution are mixed for 1 h-5 h. In the implementations of the present disclosure, the polymer solution includes a solvent and a polymer. In the implementations of the present disclosure, the solvent of the polymer solution includes one or more of N-methyl-2-pyrrolidone (NMP), methanol, ethanol, isopropanol, acetone, tetrahydrofuran (THF), or ether. In the implementations of the present disclosure, the polymer includes one or more of an organic polymer with a structure of $[C_6H_7O_6Na]_n$, an organic polymer with a structure of $[C_6H_7O_2(OH)_2OCH_2COONa]_n$, an organic polymer with a structure of $[C_3H_4O_2]_n$, an organic polymer with a structure of $[C_3H_3O_2M_a]_n$, an organic polymer with a structure of $[C_3H_3N]_n$, an organic polymer containing a structure of $—[CH_2—CF_2]_n$, an organic polymer containing a structure of $—[NHCO]—$, an organic polymer containing a structure of an imide ring $—[CO—N—CO—]—$ in a main chain, or PVP, where $M_a$ is the alkali metal element.

In some implementations of the present disclosure, the polymer solution includes a solvent, a conductive agent, and a polymer. When the polymer solution contains the conductive agent, the polymer can play a role in adhesion, and the polymer and the conductive agent can be coated on the surface of the lithium-rich-material core to form the polymer layer. In some implementations of the present disclosure, the conductive agent includes one or more of carbon black, graphite, conductive carbon microspheres, carbon nanofibers, carbon nanotubes, C60, or graphene. In some implementations of the present disclosure, in the polymer solution, a mass ratio of the polymer to the conductive agent is 1:(0.3-1.5). A specific mass ratio of the polymer to the conductive agent may be, but is not limited to, 1:0.3, 1:0.5, 1:0.7, 1:1, or 1:1.5.

In the implementations of the present disclosure, the polymer solution has a solid content of 0.3 wt %-5 wt %, and a specific solid content of the polymer solution may be, but is not limited to, 0.3 wt %, 0.5 wt %, 0.7 wt %, 1 wt %, 2 wt %, 4 wt %, or 5 wt %. In some implementations of the present disclosure, after the lithium-rich-material core and the polymer solution are mixed, the lithium-rich-material core and the polymer solution are dried by spray drying.

In some implementations of the present disclosure, after the polymer layer is formed, an electrochemically active layer can further be prepared on the polymer layer. In the implementations of the present disclosure, the electrochemically active layer is prepared on the polymer layer as follows. The lithium-rich-material core with the polymer layer and an electrochemically active material are mixed, such that the electrochemically active material is stacked on the surface of the polymer layer to form the electrochemically active layer, to obtain the lithium-replenishing additive.

In the implementations of the present disclosure, the lithium-rich-material core and the electrochemically active material can be mixed by mechanical stirring and mechano fusion. During mixing, not only does the polymer layer have an adhesive property to adhere the electrochemically active material, but also the electrochemically active material is tightly stacked on the surface of the polymer layer to form the electrochemically active layer due to a relatively large physical squeezing force. In the implementations of the present disclosure, a rotary speed of the mixing is greater than or equal to 3000 revolutions per minute (rpm), and a higher rotary speed is beneficial to formation of an electrochemically active layer with a compact structure. A specific rotary speed of the mixing may be, but is not limited to, 3000 rpm, 4000 rpm, 5000 rpm, 6000 rpm, 7000 rpm, or 8000 rpm. In the implementations of the present disclosure, mixing time is 5 min-30 min. Specific mixing time may be, but is not limited to, 5 min, 10 min, 15 min, 20 min, 25 min, or 30 min.

In the present disclosure, the interfacial layer doping is performed on the lithium-rich-material core, such that reactivity of lithium and nickel in the lithium-rich-material core is reduced. In addition, the lithium-rich-material core is coated, such that the polymer layer can effectively isolate the lithium-rich-material core from air, thereby inhibiting a reaction of lithium and nickel with air, and inhibiting production of a residual alkali, which ensures storage stability and processing stability of the lithium-replenishing additive, and is beneficial to production, storage and use of the lithium-replenishing additive. A coating layer also has a relatively high electrical conductivity property, which is beneficial to capacity performance of the lithium-rich-material core, thereby realizing efficient lithium replenishment. The preparing method is simple in processing and convenient in operation, and an obtained lithium-replenishing additive has a good stability and is suitable for large-scale production.

Figure 5:
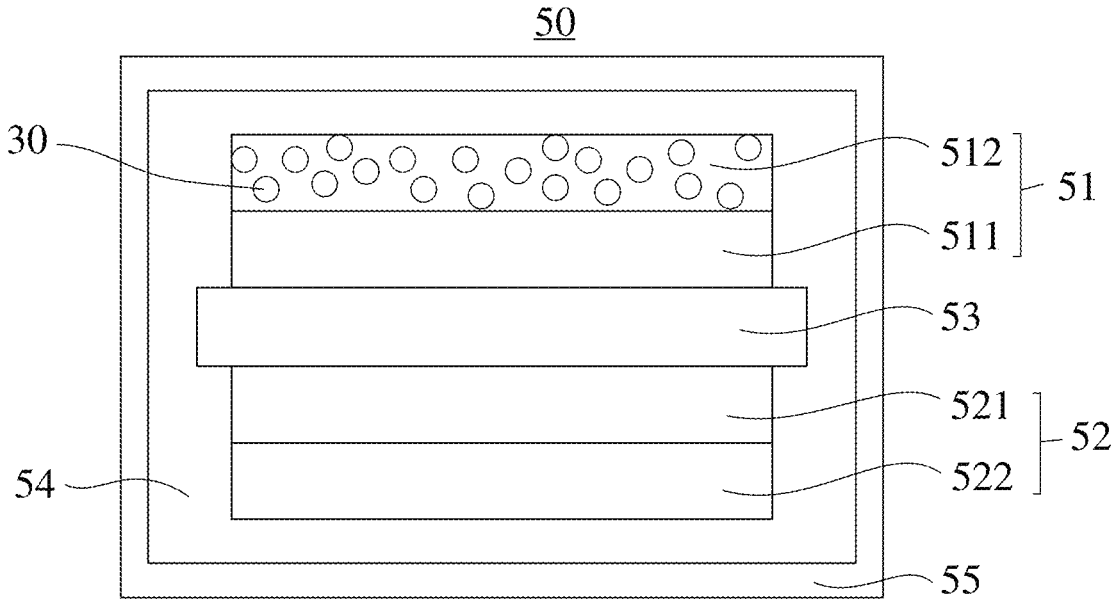
FIG. 5 is a schematic structural diagram of a lithium secondary battery provided in an implementation of the present disclosure.

A lithium secondary battery is further provided in the present disclosure. Reference can be made to FIG. 5, which is a schematic structural diagram of a lithium secondary battery 50 provided in an implementation of the present disclosure. The lithium secondary battery 50 includes a cathode sheet 51, an anode sheet 52, a separator 53, an electrolytic solution 54, and a battery shell 55. The cathode sheet 51 includes the lithium-replenishing additive 30 provided in the present disclosure. The cathode sheet 51 includes a current collector 511 and a cathode material layer 512 disposed on the current collector, the current collector 511 includes any one of copper foil and aluminum foil, and the cathode material layer 512 includes an electrode active material, the lithium-replenishing additive 30, an adhesive agent, and a conductive agent. The lithium-replenishing additive includes the lithium-replenishing additive 30 provided in the first aspect of the present disclosure. The anode sheet 52 includes a current collector 521 and an anode material layer 522. In the implementations of the present disclosure, the adhesive agent includes one or more of polyvinylidene chloride (PVDC), soluble polytetrafluoroethylene (PTFE), styrene-butadiene rubber (SBR), hydroxypropyl methyl cellulose (HPMC), methyl cellulose (MC), carboxymethyl cellulose (CMC), polyvinyl alcohol (PVA), acrylonitrile copolymer, SA, chitosan, or chitosan derivatives. In the implementations of the present disclosure, the conductive agent includes one or more of graphite, carbon black, acetylene black, graphene, carbon fibers, C60, or carbon nanotubes. In the implementations of the present disclosure, the electrode active material includes one or more of lithium cobaltate, lithium manganate, lithium iron phosphate, LVP, lithium vanadyl phosphate, lithium vanadium fluorophosphate, lithium titanate, lithium nickel cobalt manganate, or lithium nickel cobalt aluminate. In the implementations of the present disclosure, a preparing process of the cathode sheet includes the following. The electrode active material, the lithium-replenishing additive, the conductive agent, and the adhesive agent are mixed to obtain an electrode slurry, the electrode slurry is coated on the current collector, and the cathode sheet is prepared by drying, rolling, die cutting, etc.

Since the lithium-replenishing additive in the present disclosure is adopted, the lithium secondary battery provided in the present disclosure has relatively good cycle performance and safety performance, which is beneficial to application of the lithium secondary battery in various fields.

Implementations of the present disclosure will be further explained in multiple implementations below.

Implementation 1

1) Preparing a Lithium-Rich-Material Core

Mix NiO and $Li_2O$ uniformly at a molar ratio of 1:1, raise a temperature to 680° C. at a rate of 5° C./min under protection of nitrogen, and keep the temperature at 680° C. for 20 h. After cooling, crush and grade a product mechanically to obtain a $NiO \cdot Li_2O$ powder (a lithium-rich-material-core precursor). Mix the $NiO \cdot Li_2O$ powder and aluminum nitrate uniformly at a molar ratio of 98:2 and keep the temperature at 600° C. for 6 h to obtain the lithium-rich-material core, where the lithium-rich-material core has a chemical formula of $Ni_{0.98}Al_{0.02}O_{1.01} \cdot 0.98Li_2O$.

2) Preparing a Lithium-Replenishing Additive

Prepare 500 grams (g) of a coating solution A, where a solvent is NMP, and the solvent contains 0.3 wt % of PVP and 0.3 wt % of carbon nanotubes. Add 100 g of the lithium-rich-material core to the coating solution and stir for 2 h to form a polymer layer by spray-drying, to obtain the lithium-replenishing additive.

3) Preparing a Lithium Secondary Battery

Mix the lithium-replenishing additive with NCM523 (a cathode active material, $LiNi_{0.5}Co_{0.2}Mn_{0.3}O_2$) according to a mass ratio of 5:95 to obtain a mixture, mix the mixture with PVDF and carbon nanotubes at a mass ratio of 93:3:4 and add PVP for ball milling and stirring to obtain a cathode slurry, and coat the cathode slurry on a surface of aluminum foil. After rolling, perform vacuum drying overnight at 110° C. to obtain a cathode sheet. Mix ethylene carbonate (EC) with ethyl methyl carbonate (EMC) at a volume ratio of 3:7, and add lithium hexafluorophosphate ($LiPF_6$) to form an electrolytic solution, where $LiPF_6$ has a concentration of 1 mol/L. Assembly the cathode sheet, a polyethylene (PP) microporous separator, a lithium sheet, and the electrolytic solution to obtain the lithium secondary battery.

Implementation 2

1) Preparing a Lithium-Rich-Material Core

The same as implementation 1.

2) Preparing a Lithium-Replenishing Additive

Prepare 500 g of a coating solution A, where a solvent is NMP, and the solution contains 0.3 wt % of PVP and 0.3 wt % of carbon nanotubes. Add 100 g of lithium-rich-material core to the coating solution and stir for 2 h to form a polymer layer by spray-drying. Add the lithium-rich-material core with the polymer layer and lithium iron phosphate with a size of 80 nm to a mechano-fusion machine, where a mass ratio of the lithium-rich-material core with the polymer layer to lithium iron phosphate is 1:0.05. Fuse and process the lithium-rich-material core with the polymer layer and lithium iron phosphate at a speed of 5000 rpm for 15 min to obtain the lithium-replenishing additive.

3) Preparing a Lithium Secondary Battery

The same as implementation 1.

Implementation 3

1) Preparing a Lithium-Rich-Material Core

Mix NiO and $Li_2O$ uniformly at a molar ratio of 1:1, raise a temperature to 680° C. at a rate of 5° C./min under protection of nitrogen, and keep the temperature at 680° C. for 20 h. After cooling, crush and grade a product mechanically to obtain a $NiO \cdot Li_2O$ powder (a lithium-rich-material-core precursor). Mix the $NiO \cdot Li_2O$ powder and copper nitrate uniformly at a molar ratio of 95:5 and keep the temperature at 600° C. for 6 h to obtain the lithium-rich-material core, where the lithium-rich-material core has a chemical formula of $Ni_{0.95}Cu_{0.05}O \cdot 0.95Li_2O$.

2) Preparing a Lithium-Replenishing Additive

Prepare 500 g of a coating solution A, where a solvent is THF, and the solvent contains 0.15 wt % of PAA and 0.3 wt % of graphene. Add 100 g of the lithium-rich-material core to the coating solution and stir for 2 h to form a polymer layer by spray-drying. Add the lithium-rich-material core with the polymer layer and lithium manganese iron phosphate with a size of 50 nm to a mechano-fusion machine, where a mass ratio of the lithium-rich-material core with the polymer layer to lithium manganese iron phosphate is 1:0.05. Fuse and process the lithium-rich-material core with the polymer layer and lithium manganese iron phosphate at a speed of 3000 rpm for 30 min to obtain the lithium-replenishing additive.

3) Preparing a Lithium Secondary Battery

The same as implementation 1.

Implementation 4

1) Preparing a Lithium-Rich-Material Core

Mix NiO and $Li_2O$ uniformly at a molar ratio of 1:1, raise a temperature to 650° C. at a rate of 5° C./min under protection of nitrogen, and keep the temperature at 650° C. for 17 h. After cooling, crush and grade a product mechanically to obtain a $NiO \cdot Li_2O$ powder (a lithium-rich-material-core precursor). Mix the $NiO \cdot Li_2O$ powder and titanium dioxide uniformly at a molar ratio of 95:5 and keep the temperature at 600° C. for 6 h to obtain the lithium-rich-material core, where the lithium-rich-material core has a chemical formula of $Ni_{0.95}Ti_{0.05}O \cdot 0.95Li_2O$.

2) Preparing a Lithium-Replenishing Additive

Prepare 500 g of a coating solution A, where a solvent is THF, and the solvent contains 0.3 wt % of SCMC and 0.3 wt % of conductive carbon black. Add 100 g of the lithium-rich-material core to the coating solution and stir for 3 h to form a polymer layer by spray-drying. Add the lithium-rich-material core with the polymer layer and lithium manganese iron phosphate with a size of 80 nm to a mechano-fusion machine, where a mass ratio of the lithium-rich-material core with the polymer layer to lithium manganese iron phosphate is 1:0.05. Fuse and process the lithium-richmaterial core with the polymer layer and lithium manganese iron phosphate at a speed of 3000 rpm for 30 min to obtain the lithium-replenishing additive.

3) Preparing a Lithium Secondary Battery

The same as implementation 1.

Implementation 5

1) Preparing a Lithium-Rich-Material Core

Mix NiO and $Li_2O$ uniformly at a molar ratio of 1:0.95, raise a temperature to 680° C. at a rate of 5° C./min under protection of nitrogen, and keep the temperature at 680° C. for 20 h. After cooling, crush and grade a product mechanically to obtain a $NiO \cdot 0.95Li_2O$ powder (a lithium-rich-material-core precursor). Mix the $NiO \cdot 0.95Li_2O$ powder and copper nitrate uniformly at a molar ratio of 98:2 and keep the temperature at 600° C. for 6 h to obtain the lithium-rich-material core, where the lithium-rich-material core has a chemical formula of $Ni_{0.98}Cu_{0.02}O \; 0.931Li_2O$.

2) Preparing a Lithium-Replenishing Additive

Prepare 500 g of a coating solution A, where a solvent is THF, and the solvent contains 0.15 wt % of PAA and 0.3 wt % of graphene. Add 100 g of the lithium-rich-material core to the coating solution and stir for 2 h to form a polymer layer by spray-drying. Add the lithium-rich-material core with the polymer layer and lithium manganese iron phosphate with a size of 50 nm to a mechano-fusion machine, where a mass ratio of the lithium-rich-material core with the polymer layer to lithium manganese iron phosphate is 1:0.05. Fuse and process the lithium-rich-material core with the polymer layer and lithium manganese iron phosphate at a speed of 3000 rpm for 30 min to obtain the lithium-replenishing additive.

3) Preparing a Lithium Secondary Battery

The same as implementation 1.

Implementation 6

1) Preparing a Lithium-Rich-Material Core

Mix NiO and $Li_2O$ uniformly at a molar ratio of 1:0.95, raise a temperature to 680° C. at a rate of 5° C./min under protection of nitrogen, and keep the temperature at 680° C. for 20 h. After cooling, crush and grade a product mechanically to obtain a $NiO \cdot 0.95Li_2O$ powder (a lithium-rich-material-core precursor). Mix the $NiO \cdot 0.95Li_2O$ powder and aluminum nitrate uniformly at a molar ratio of 96:4 and keep the temperature at 600° C. for 6 h to obtain the lithium-rich-material core, where the lithium-rich-material core has a chemical formula of $Ni_{0.96}Al_{0.04}O_{1.02} \cdot 0.912Li_2O$.

2) Preparing a Lithium-Replenishing Additive

Prepare 500 g of a coating solution A, where a solvent is THF, and the solvent contains 0.15 wt % of PAA and 0.3 wt % of graphene. Add 100 g of the lithium-rich-material core to the coating solution and stir for 2 h to form a polymer layer by spray-drying. Add the lithium-rich-material core with the polymer layer and lithium manganese iron phosphate with a size of 50 nm to a mechano-fusion machine, where a mass ratio of the lithium-rich-material core with the polymer layer to lithium manganese iron phosphate is 1:0.05. Fuse and process the lithium-rich-material core with the polymer layer and lithium manganese iron phosphate at a speed of 3000 rpm for 30 min to obtain the lithium-replenishing additive.

3) Preparing a Lithium Secondary Battery

The same as implementation 1.

Implementation 7

1) Preparing a Lithium-Rich-Material Core

Mix NiO and $Li_2O$ uniformly at a molar ratio of 1:0.9, raise a temperature to 680° C. at a rate of 5° C./min under protection of nitrogen, and keep the temperature at 680° C. for 20 h. After cooling, crush and grade a product mechanically to obtain a $NiO \cdot 0.9Li_2O$ powder (a lithium-rich-material-core precursor). Mix the $NiO \cdot 0.9Li_2O$ powder and cobalt nitrate uniformly at a molar ratio of 95:5 and keep the temperature at 600° C. for 6 h to obtain the lithium-rich-material core, where the lithium-rich-material core has a chemical formula of $Ni_{0.95}Co_{0.050} O \cdot 0.855Li_2O$.

2) Preparing a Lithium-Replenishing Additive

Prepare 500 g of a coating solution A, where a solvent is THF, and the solvent contains 0.15 wt % of PAA and 0.3 wt % of graphene. Add 100 g of the lithium-rich-material core to the coating solution and stir for 2 h to form a polymer layer by spray-drying. Add the lithium-rich-material core with the polymer layer and lithium manganese iron phosphate with a size of 50 nm to a mechano-fusion machine, where a mass ratio of the lithium-rich-material core with the polymer layer to lithium manganese iron phosphate is 1:0.05. Fuse and process the lithium-rich-material core with the polymer layer and lithium manganese iron phosphate at a speed of 3000 rpm for 30 min to obtain the lithium-replenishing additive.

3) Preparing a Lithium Secondary Battery

The same as implementation 1.

In order to demonstrate beneficial effects of the implementations of the present disclosure, comparative examples are set.

Comparative Example 1

1) Preparing a Lithium-Replenishing Additive

Mix NiO and $Li_2O$ uniformly at a molar ratio of 1:1, raise a temperature to 680° C. at a rate of 5° C./min under protection of nitrogen, and keep the temperature at 680° C. for 20 h. After cooling, crush and grade a product mechanically to obtain a $NiO \cdot Li_2O$ powder (the lithium-replenishing additive).

2) Preparing a Lithium Secondary Battery

The same as implementation 1.

Comparative Example 2

1) Preparing a Lithium-Replenishing Additive

Mix NiO and $Li_2O$ uniformly at a molar ratio of 1:1, raise a temperature to 680° C. at a rate of 5° C./min under protection of nitrogen, and keep the temperature at 680° C. for 20 h. After cooling, crush and grade a product mechanically to obtain a $NiO \cdot Li_2O$ powder. Prepare 500 g of a coating solution A, where a solvent is NMP, and the solvent contains 0.3 wt % of PVP and 0.3 wt % of carbon nanotubes. Add 100 g of the $NiO \cdot Li_2O$ powder to the coating solution and stir for 2 h to form a polymer layer by spray-drying, to obtain the lithium-replenishing additive.

2) Preparing a Lithium Secondary Battery

The same as implementation 1.

Comparative Example 3

1) Preparing a Lithium-Replenishing Additive

Mix NiO and $Li_2O$ uniformly at a molar ratio of 1:1, raise a temperature to 680° C. at a rate of 5° C./min under protection of nitrogen, and keep the temperature at 680° C. for 20 h. After cooling, crush and grade a product mechanically to obtain a $NiO \cdot Li_2O$ powder. Prepare 500 g of a coating solution A, where a solvent is NMP, and the solvent contains 0.3 wt % of PVP and 0.3 wt % of carbon nanotubes. Add 100 g of the $NiO \cdot Li_2O$ powder to the coating solution and stir for 2 h to form a polymer layer by spray-drying. Add the lithium-rich-material core with the polymer layer and lithium iron phosphate with a size of 80 nm to a mechanofusion machine, where a mass ratio of the lithium-rich-material core with the polymer layer to lithium iron phosphate is 1:0.05. Fuse and process the lithium-rich-material core with the polymer layer and lithium iron phosphate at a speed of 5000 rpm for 15 min to obtain the lithium-replenishing additive.

2) Preparing a Lithium Secondary Battery

The same as implementation 1.

Effect Implementation

Figure 6:
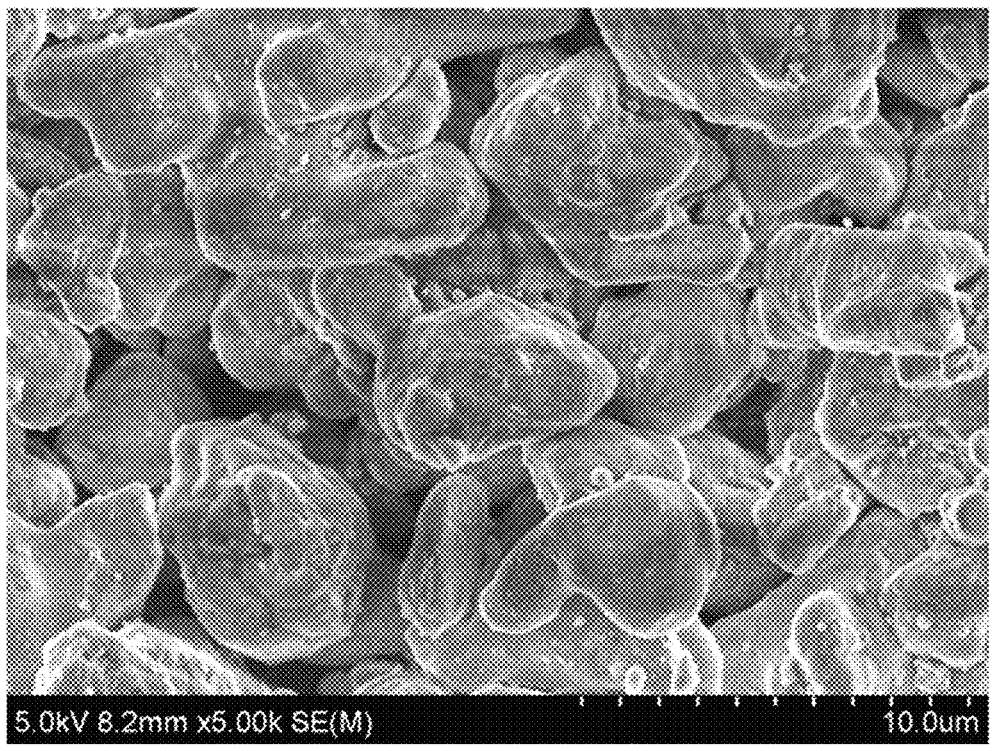
FIG. 6 is a scanning electron microscope (SEM) pattern of a lithium-replenishing additive provided in implementation 1 of the present disclosure.
Figure 7:
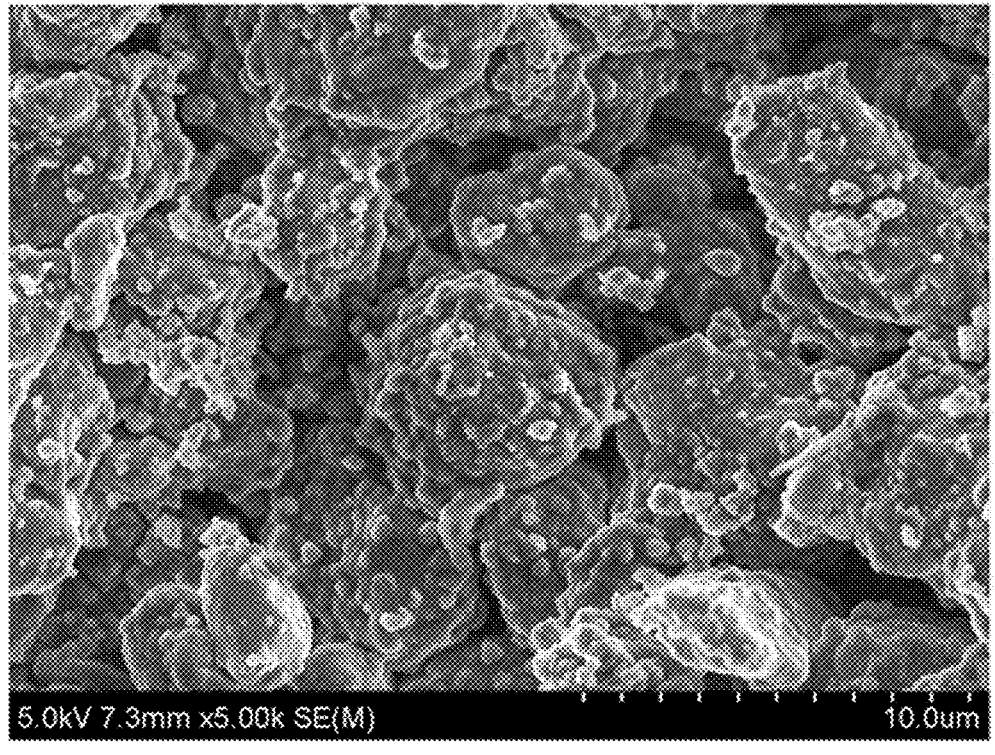
FIG. 7 is a SEM pattern of a lithium-replenishing additive provided in implementation 2 of the present disclosure.

1) Through a scanning electron microscope (SEM), morphological characterization is performed on lithium-replenishing additives of implementation 1 and implementation 2. Reference can be made to FIG. 6 and FIG. 7, where FIG. 6 is a SEM pattern of a lithium-replenishing additive provided in implementation 1 of the present disclosure, and FIG. 7 is a SEM pattern of a lithium-replenishing additive provided in implementation 2 of the present disclosure. It can be seen from FIG. 6 that in the lithium-replenishing additive of implementation 1, the polymer layer is tightly wrapped on a surface of the lithium-rich-material core to form a relatively smooth protective layer. It can be seen from FIG. 7 that a surface of the lithium-replenishing additive of implementation 2 has more granular substances, and the granular substances are electrochemically active materials. The electrochemically active materials are tightly combined to form an electrochemically active layer, such that the lithium-rich-material core is protected and the reaction between the lithium-rich-material core and air is inhibited.

Figure 8:
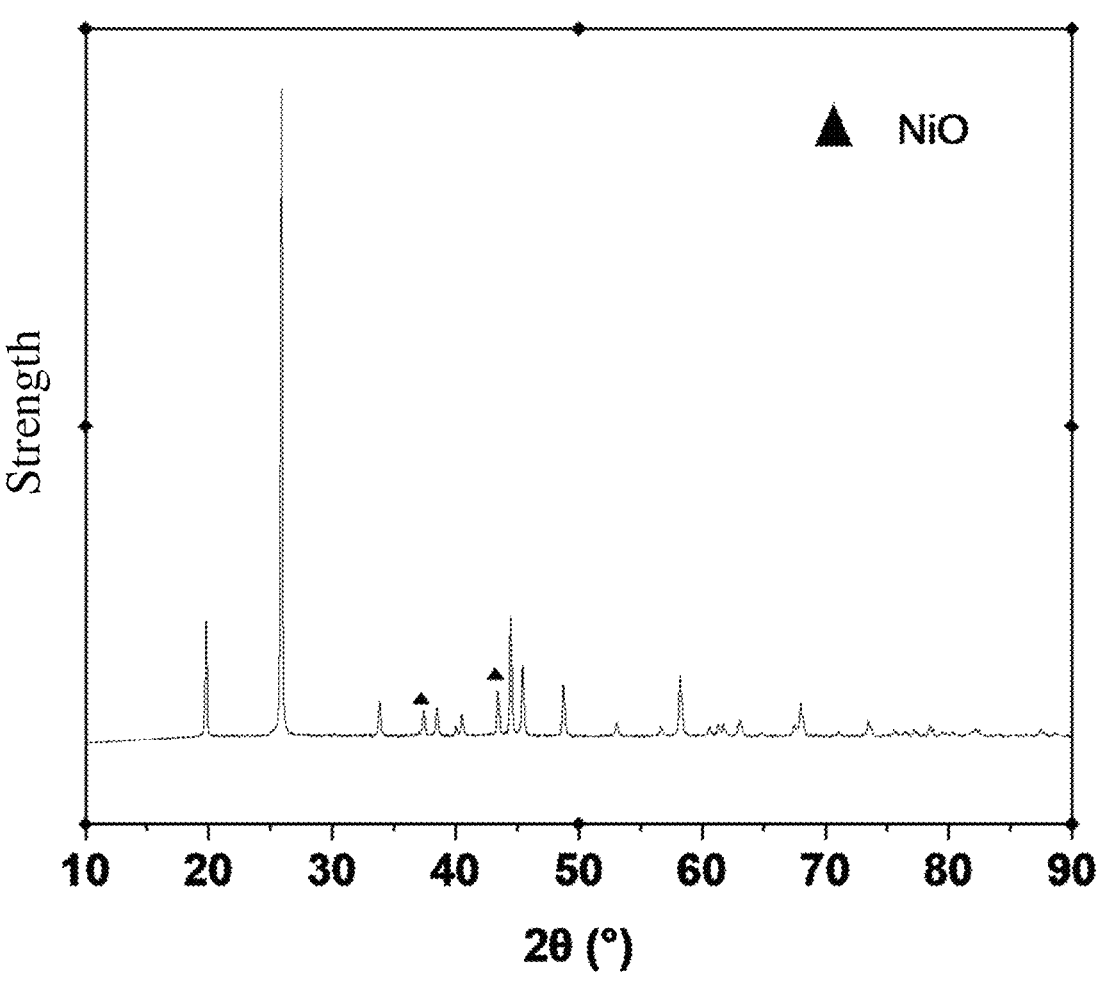
FIG. 8 is an X-ray diffraction pattern of a lithium-rich-material core provided in implementation 2 of the present disclosure.
Figure 9:
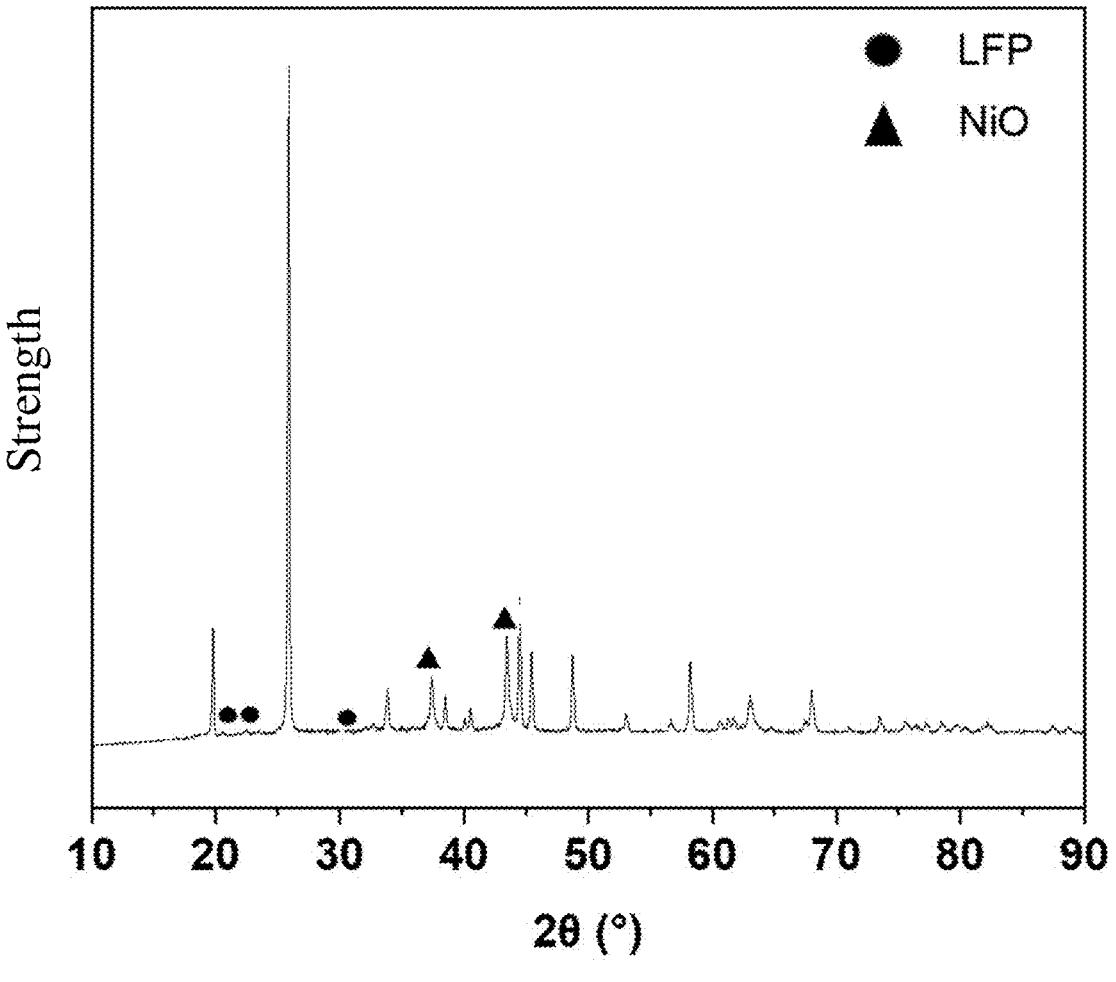
FIG. 9 is an X-ray diffraction pattern of the lithium-replenishing additive provided in implementation 2 of the present disclosure.

2) X-ray diffraction characterization is performed on the lithium-rich-material core and the lithium-replenishing additive of implementation 2. Reference can be made to FIG. 8 and FIG. 9, where FIG. 8 is an X-ray diffraction pattern of a lithium-rich-material core provided in implementation 2 of the present disclosure, and FIG. 9 is an X-ray diffraction pattern of the lithium-replenishing additive provided in implementation 2 of the present disclosure. It can be seen from FIG. 8 that the lithium-rich-material core has diffraction peaks of NiO. It can be seen from FIG. 9 that the lithium-replenishing additive has diffraction peaks of lithium iron phosphate in addition to the diffraction peaks of NiO, which illustrates that lithium iron phosphate has been coated successfully to form the electrochemically active layer.

3) By an inductively coupled plasma (ICP) emission spectrophotometric method, a content of the doping element M in lithium-replenishing additives of implementations 1-7 is analyzed. Reference can be made to Table 1 for test results, value y of the doping element M in Table 1 is the content of the doping element M in the lithium-replenishing additive.

4) Residual alkali amounts of lithium-replenishing additives of implementations 1-7 and comparative examples 1-3 are tested, and a test method specifically includes the following. Weigh 5 g of the lithium-replenishing additive of implementations 1-7 and comparative examples 1-3 individually. Add 50 mL of ultra-pure water without $CO_2$ and 5 g of the lithium-replenishing additive to a beaker and dissolve. Ultrasonically oscillate for 5 min at an ultrasonic frequency of 5 KHz and a power of 50 w. Stir every 1 min. Filter a mixed liquor into a 100 ml volumetric flask with quantitative paper, and perform constant volume. Take the above sample solution, and titrate with hydrochloric acid (HCl) standard solution. Record volume V1 and volume V2 of consumed HCl standard solution, where V1 is a volume of HCl standard solution consumed during titration to a first jump point, and V2 is a volume of HCl standard solution consumed during titration from the first jump point to a second jump point. Calculate residual alkali amounts of $OH^-$ and $CO_3^{2-}$ based on following formulas:

$$w(OH^-) = \frac{17.00 \cdot c \cdot (V_1 - V_2)}{m \cdot \frac{V_3}{V_4} \cdot 1000} \cdot 100, \text{ and } w(CO_3^{2-}) = \frac{60.00 \cdot c \cdot V_2}{m \cdot \frac{V_3}{V_4} \cdot 1000} \cdot 100,$$

where m is an actual mass of a sample, c is a concentration of the HCl standard solution, $V_3$ is a volume of filtrate, and $V_4$ is a volume of 100 ml of filtrate after performing the constant volume. Reference can be made to Table 1 for the residual alkali amounts of the lithium-replenishing additives of implementations 1-7 and comparative examples 1-3.

5) Electrochemical performances of lithium secondary batteries of implementations 1-7 and comparative examples 1-3 are tested, and test conditions include the following. Place assembled batteries at room temperature for 24 hours, and then perform charging-and-discharging tests at a charging-and-discharging voltage of 2.7V-4.3V. The electrochemical performances of the lithium secondary batteries of implementations 1-7 and comparative examples 1-3 are shown in Table 1.

TABLE 1

Table of experimental parameters of lithium-replenishing additives and lithium-ion batteries of implementations 1-7 and comparative examples 1-3

| | Performance parameters | | | | |
|---|---|---|---|---|---|
| Implementations | y value of the doping element M | Residual alkali amount (%) | Cathode slurry state | First efficiency (%) | Capacity retention rate after 50 cycles (%) |
| Implementation 1 | 0.0199 | 4.6 | Normal | 90.2 | 92.1 |
| Implementation 2 | 0.0199 | 4 | Normal | 91 | 95 |
| Implementation 3 | 0.051 | 4.3 | Normal | 90.5 | 93.2 |
| Implementation 4 | 0.05 | 4.5 | Normal | 90.8 | 92.5 |
| Implementation 5 | 0.02 | 4.7 | Normal | 90.2 | 92.0 |

TABLE 1-continued

Table of experimental parameters of lithium-replenishing additives and
lithium-ion batteries of implementations 1-7 and comparative examples 1-3

| | | | | | Capacity retention |
| | | Residual | | | rate after |
| | y value of | alkali | Cathode | First | 50 cycles |
| | the doping | amount | slurry | efficiency | |
| Implementations | element M | (%) | state | (%) | (%) |
|---|---|---|---|---|---|
| Implementation 6 | 0.039 | 4.3 | Normal | 90.6 | 92.1 |
| Implementation 7 | 0.05 | 4.3 | Normal | 91.3 | 91.9 |
| Comparative example 1 | | 12 | Jelly | 88 | 84 |
| Comparative example 2 | | 5 | Normal | 89 | 87 |
| Comparative example 3 | | 4.5 | Normal | 89.5 | 89.5 |

It can be seen from Table 1 that the lithium-replenishing additives in implementations 1-7 of the present disclosure each have low residual alkali amounts, prepared cathode slurries appear no jelly phenomenon and are easy to coat, and when a prepared cathode slurry is added to the lithium secondary battery, the battery can have high first efficiency and relatively good cycle stability, thereby improving performance of the lithium-ion battery.

It can be seen from experiments of comparative examples that the lithium-replenishing additive of comparative example 1 has no polymeric layer, so the residual alkali amount of the lithium-replenishing additive of comparative example 1 is much higher than each of the residual alkali amounts of the lithium-replenishing additives of implementations 1-7. In addition, during preparing of the cathode slurry, due to a high residual alkali content, the cathode slurry absorbs a large amount of water, resulting in formation of jelly, which is not beneficial to coating of the cathode slurry.

It can be seen from implementation 1 and comparative example 2 that the lithium-replenishing additive of implementation 1 has a relatively low residual alkali amount after performing the interfacial layer doping, and a prepared lithium secondary battery has relatively high first efficiency and cycle performance.

It can be seen from implementation 1 and implementation 2 that with aid of the electrochemically active layer, the residual alkali content can be further reduced, which is beneficial to application of the lithium-replenishing additive in the lithium secondary battery.

The above implementations only show several implementations of the present disclosure, and the descriptions thereof are relatively specific and detailed, but cannot be understood as a limitation to the scope of the present disclosure. It should be noted that for those of ordinary skill in the art, without departing from the concept of the present disclosure, several modifications and improvements can be made, and these all belong to the protection scope of the present disclosure. Therefore, the protection scope of the present disclosure shall be referred to the appended claims.

What is claimed is:

1. A lithium-replenishing additive, comprising:
a lithium-rich-material core; and
a shell layer disposed on the lithium-rich-material core, wherein
the lithium-rich-material core is made of a lithium-rich material with an average chemical formula of $aNi_xM_yO_z \cdot bLi_2O$, wherein $0.95 \le x \le 1$, $0.01 \le y \le 0.05$, $1 \le z \le 1.15$, $0.8 \le a \le 1.1$, $0.8 \le b \le 1.1$, and the M comprises one or more of copper (Cu), cobalt (Co), aluminum (Al), titanium (Ti), vanadium (V), zirconium (Zr), or iron (Fe);
the shell layer comprises a polymer layer; and
the shell layer further comprises an electrochemically active layer disposed on an outer surface of the polymer layer, and the electrochemically active layer is made of an electrochemically active material; and the electrochemically active material comprises one or more of lithium iron phosphate, lithium iron manganese phosphate, lithium vanadium phosphate (LVP), lithium vanadyl phosphate, lithium vanadium fluorophosphate, lithium titanate, or lithium nickel cobalt manganate, wherein a mass of the polymer layer accounts for 1%-10% of a total mass of the lithium-replenishing additive.

2. The lithium-replenishing additive of claim 1, wherein the lithium-rich-material core comprises an internal layer and a doped interfacial layer, the doped interfacial layer is disposed on at least part of a surface of the internal layer, the M is in the doped interfacial layer, and the doped interfacial layer has a thickness of 1 nm-100 nm.

3. The lithium-replenishing additive of claim 1, wherein the lithium-rich-material core has a median particle size D50 of 2 μm-10 μm, D10/D50 ≥ 0.3, and D90/D50 ≤ 2.

4. The lithium-replenishing additive of claim 1, wherein a mass of the lithium-rich-material core accounts for 90%-99% of a mass of the lithium-replenishing additive.

5. The lithium-replenishing additive of claim 1, wherein the polymer layer contains a polymer, and the polymer comprises one or more of an organic polymer with a structure of $[C_6H_7O_6Na]_n$, an organic polymer with a structure of $[C_6H_7O_2(OH)_2OCH_2COONa]_n$, an organic polymer with a structure of $[C_3H_4O_2]_n$, an organic polymer with a structure of $[C_3H_3O_2M_a]_n$, an organic polymer with a structure of $[C_3H_3N]_n$, an organic polymer containing a structure of $-[CH_2-CF_2]_n$, an organic polymer containing a structure of $-[NHCO]-$, an organic polymer containing a structure of an imide ring $-[CO-N-CO-]-$ in a main chain, or polyvinylpyrrolidone (PVP), $M_a$ being an alkali metal element.

6. The lithium-replenishing additive of claim 5, wherein the polymer layer further contains a conductive agent, the conductive agent comprises one or more of carbon black, graphite, conductive carbon microspheres, carbon nanofibers, carbon nanotubes, carbon 60 (C60), or graphene; and in the polymer layer, a mass ratio of the polymer to the conductive agent is 1:(0.3-1.5).

7. The lithium-replenishing additive of claim 5, wherein the polymer has a molecular weight greater than or equal to 100,000.

8. The lithium-replenishing additive of claim 1, wherein the polymer layer has a thickness of 2 nm-50 nm.

9. The lithium-replenishing additive of claim 1, wherein the lithium-replenishing additive has a specific surface area of 1 m²/g-10 m²/g.

10. The lithium-replenishing additive of claim 1, wherein the electrochemically active material has a particle size of 30 nm-200 nm.

11. The lithium-replenishing additive of claim 1, the electrochemically active material further comprises carbon, and a mass of carbon accounts for 0.5%-3% of a mass of the electrochemically active material.

12. The lithium-replenishing additive of claim 1, wherein the electrochemically active layer has a thickness of 100 nm-500 nm.

13. The lithium-replenishing additive of claim 1, wherein the lithium-rich-material core comprises an internal layer and a doped interfacial layer, the doped interfacial layer is disposed on at least part of a surface of the internal layer, the M is only doped in the doped interfacial layer, and in a direction from a surface layer of the lithium-rich-material core to a center of the lithium-rich-material core, a content of the M is gradually decreased and contents of lithium and nickel are gradually increased.

14. A preparing method of the lithium-replenishing additive of claim 1, comprising:

mixing a nickel source and a lithium source fully to react at 500° C.-850° C. for 10 h-48 h to obtain a lithium-rich-material-core precursor;

mixing the lithium-rich-material-core precursor and a doping source to react at 400° C.-700° C. for 1 h-6 h to obtain a lithium-rich-material core, wherein the doping source comprises a doping element M, the doping element M comprises one or more of Cu, Co, Al, Ti, V, Zr, or Fe, and the lithium-rich-material core comprises the lithium-rich material with the average chemical formula of $aNi_xM_yO_z \cdot bLi_2O$, wherein $0.95 \leq x \leq 1$, $0.01 \leq y \leq 0.05$, $1 \leq z \leq 1.15$, $0.8 \leq a \leq 1.1$, $0.8 \leq b \leq 1.1$, and the M comprises one or more of Cu, Co, Al, Ti, V, Zr, or Fe; and coating the lithium-rich-material core with a polymer to form the polymer layer, to obtain the lithium-replenishing additive, wherein the shell layer further comprises an electrochemically active layer disposed on a surface of the polymer layer, and the electrochemically active layer is made of an electrochemically active material; and the electrochemically active material comprises one or more of lithium iron phosphate, lithium iron manganese phosphate, lithium vanadium phosphate (LVP), lithium vanadyl phosphate, lithium vanadium fluorophosphate, lithium titanate, or lithium nickel cobalt manganate.

15. The preparing method of the lithium-replenishing additive of claim 14, wherein the coating the lithium-rich-material core with the polymer to form the polymer layer comprises:

mixing the lithium-rich-material core and a polymer solution and drying to obtain the polymer layer.

16. The preparing method of the lithium-replenishing additive of claim 14, further comprising:

after forming the polymer layer, preparing an electrochemically active layer on the polymer layer, wherein the electrochemically active layer is made of an electrochemically active material.

17. The preparing method of the lithium-replenishing additive of claim 16, wherein the preparing the electrochemically active layer on the polymer layer comprises:

mixing the lithium-rich-material core with the polymer layer and the electrochemically active material, to make the electrochemically active material stacked on the polymer layer.

18. A lithium secondary battery, comprising:

a cathode sheet;

an anode sheet;

a separator; and an electrolytic solution, wherein the cathode sheet comprises a lithium-replenishing additive comprising:

a lithium-rich-material core; and a shell layer disposed on the lithium-rich-material core, wherein the lithium-rich-material core is made of a lithium-rich material with an average chemical formula of $aNi_xM_yO_z \cdot bLi_2O$, wherein $0.95 \leq x \leq 1$, $0.01 \leq y \leq 0.05$, $1 \leq z \leq 1.15$, $0.8 \leq a \leq 1.1$, $0.8 \leq b \leq 1.1$, and the M comprises one or more of copper (Cu), cobalt (Co), aluminum (Al), titanium (Ti), vanadium (V), zirconium (Zr), or iron (Fe);

the shell layer comprises a polymer layer; and the shell layer further comprises an electrochemically active layer disposed on an outer surface of the polymer layer, and the electrochemically active layer is made of an electrochemically active material; and the electrochemically active material comprises one or more of lithium iron phosphate, lithium iron manganese phosphate, lithium vanadium phosphate (LVP), lithium vanadyl phosphate, lithium vanadium fluorophosphate, lithium titanate, or lithium nickel cobalt manganate, wherein a mass of the polymer layer accounts for 1%-10% of a total mass of the lithium-replenishing additive.

* * * * *